United States Patent [19]

Blomkvist et al.

[11] Patent Number: 4,506,554
[45] Date of Patent: Mar. 26, 1985

[54] MAGNETOELASTIC TORQUE TRANSDUCER

[75] Inventors: Kent Blomkvist, Surahammar; Jan O. Nordvall, Västerås, both of Sweden

[73] Assignee: ASEA Aktiebolag, Västerås, Sweden

[21] Appl. No.: 501,799

[22] Filed: Jun. 7, 1983

[51] Int. Cl.³ .............................................. G01L 3/10
[52] U.S. Cl. ................................................. 73/862.36
[58] Field of Search .......... 73/862.08, 862.36, DIG. 2; 324/209; 336/20

[56] References Cited

U.S. PATENT DOCUMENTS

| | | | |
|---|---|---|---|
| 2,553,833 | 5/1951 | Rifenbergh | 73/862.36 |
| 3,011,340 | 12/1961 | Dahle | |
| 3,465,581 | 9/1969 | Hohenberg | 73/862.36 |
| 4,306,462 | 12/1981 | Meixner | 73/862.36 |
| 4,414,855 | 11/1983 | Iwasaki | 73/862.36 |

FOREIGN PATENT DOCUMENTS

| | | |
|---|---|---|
| 1900194 | 7/1970 | Fed. Rep. of Germany ... 73/862.36 |
| 0667836 | 6/1979 | U.S.S.R. |
| 0838448 | 6/1981 | U.S.S.R. |

Primary Examiner—Charles A. Ruehl
Attorney, Agent, or Firm—Watson Cole Grindle & Watson

[57] ABSTRACT

A torque transducer comprises a sleeve of magnetic material, which is attached concentrically and rigidly to an axle, and at least two stationary windings for excitation of the axle and two windings for sensing the torque transmitted by the axle, as well as a magnetic housing concentrically surrounding the windings. The sleeve is formed with two parallel, annular zones, which are provided with slits having a substantially regular pitch and making an angle of ±45° with a generatrix of the envelope surface of the sleeve. The excitation windings are series-connected and generate a magnetic flux in the axle surface. The measuring windings are connected in opposition, whereby the measuring signal is approximately zero in case of zero torque in the axle. When the axle is subjected to a torque, the bars between the slits in the annular zones will be subjected to tensile stress and compressive stress, respectively, in the direction of the flux. This leads to a polarized magnetic unbalance, which results in a difference voltage from the measuring windings which, after phase-sensitive detection, gives a measure of the magnitude and sign of the torque.

5 Claims, 9 Drawing Figures

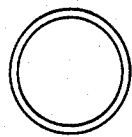
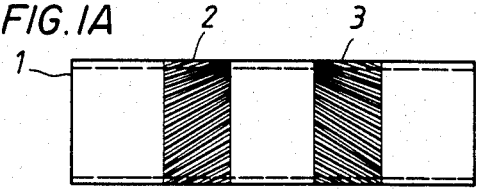
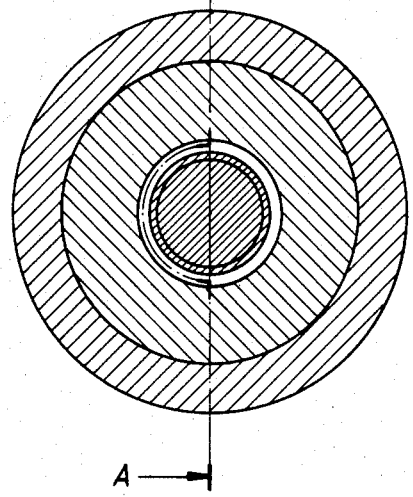
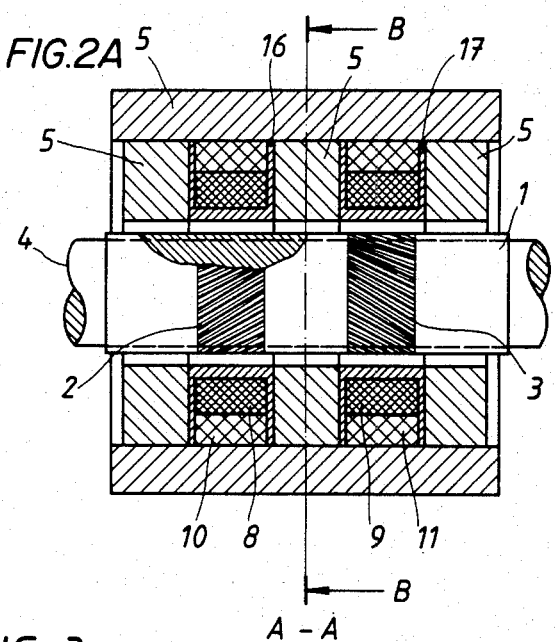
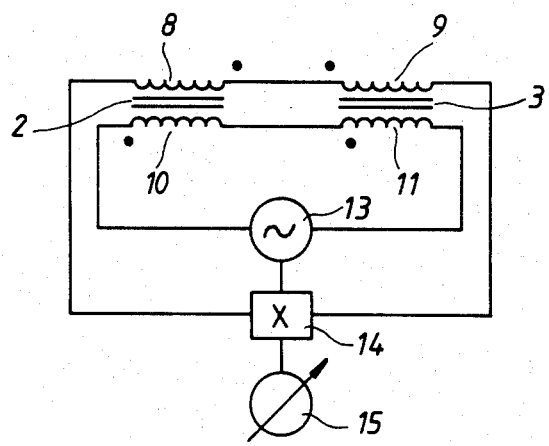

A - A

MAGNETOELASTIC TORQUE TRANSDUCER

The present invention relates to a transducer for measuring, in a contactless manner, the torque on rotating or stationary axles.

Magnetoelastic torque transducers are previously known, for example from Swedish Pat. No. 167,387. These transducers have the disadvantage that internal stresses in the surface of the axle material cause variations in the output signal of the transducer when rotating the axle. Admittedly these variations can be reduced by heat treatment of the axle and by increasing the number of poles on the transducer in question and, where possible, by measuring for a longer period of time and forming the mean value. However, it is difficult, using heat treatment methods, to reduce the internal stresses in the axle surface below about 10 N/mm$^2$, and even though the number of poles is great, the signal variation upon rotation of the axle will be considerable, at least if there are requirements for immediate measuring so that the formation of a mean value over a certain time is not allowable.

To eliminate the above-mentioned difficulties, an entirely different solution has also been tested. In the axle in question, which here must be of a magnetic material, parallel grooves with an even pitch and making an angle of +45° and −45°, respectively, with a generatrix of the axle surface have been cut into two parallel, annular zones at some distance away from each other. This results in a form of magnetic orientation in the direction of the grooves in the two zones, among other things because of the increased path length perpendicularly to the grooves. If the axle is loaded with a torsional moment and has positive magnetostriction, the reluctance decreases in the zone where the grooves are parallel to the positive principal stress and the reluctance increases in the other zone where the grooves are parallel to the negative principal stress. By comparing the reluctances in a difference coupling, a measure of the applied torque is obtained. This principle is realized by surrounding each zone with two stationary coils, concentric with the axle, said coils being used respectively for excitation by alternating current with series-connected coils and sensing of the difference between the fluxes in the two zones with oppositely-connected coils. An iron core made in the form of a solid of revolution with an E-shaped generating surface surrounds the coils and has air gaps towards the axle.

The above solution functions well in principle, but has certain drawbacks. First of all, the material in the axle must above all be selected in view of the field of use in question, and the magnetic properties necessary for the measuring are of secondary importance. In many cases, for example, a high strength and thereby great hardness are required, whereby the permeability and thus the sensitivity become very low; in other cases an austenitic stainless axle is required, which renders the measuring method completely useless.

Also in those cases where the magnetic properties of the axle are sufficiently good, other difficulties are encountered. Thus, as mentioned before, an axle always has considerable random magnetic orientation, primarily because of internal stresses but also in the form of regions having different crystal orientation, all being the result of the manufacturing process for axles, whether it is the question of forging in case of thick axles or bar rolling in case of weaker dimensions. Admittedly, this magnetic orientation can be reduced to a considerable extent by repeated normalizations, if they are carried out with great care with the axles in suspended state and at a sufficiently large distance from each other and from the furnace wall. Also when the greatest care is exercised, a residual orientation of a few percent is always obtained, probably because of said varying crystal orientation, which is difficult to eliminate completely.

If the said coils with the associated magnetic core were absolutely concentric with the axle and without orientation in the end walls, the above-mentioned remaining orientation in the axle would not produce any angle-dependent signal. However, in view of imperfections in the centering and insufficient ring-symmetrical orientation in the end walls, a certain angle-dependence of the signal is always obtained, even with the best heat treatment of the axles, which is due to the manufacturing process of said axles.

The situation will be quite different if, instead, the axle is provided with a sleeve which, for example, is soldered, in which sleeve the above-mentioned zones have been formed. In this case, the grooves may suitably be formed as through-going slits. The advantage of such a sleeve is that it can be made from rolled tube material, which by the rolling has received much more homogeneous properties in the peripheral direction. In this way, the variation of the signal with the angle may be reduced by at least one order of magnitude, which is a condition for the applicability of the measuring method for many fields of application with a low torque.

With a separately manufactured measuring sleeve, the advantage is of course also gained that it is possible to select a material having favourable magnetic properties, which may be combined with an axle which may be made from a high-strength material having poor magnetic properties, or an axle of austenitic, non-magnetic steel. However, also in case of axles of ordinary axle steel having relatively good magnetic properties, a sleeve of tube material has, as mentioned, the advantage of having a considerably more homogeneous magnetic orientation.

The solder used when soldering the sleeve forms a non-magnetic distance material, which reduces the magnetic coupling between the sleeve and the axle. A greater magnetic isolation of the sleeve may be obtained by turning down the axle below either zone, whereby the sleeve is only attached to the axle at the ends and in the middle, in this case possibly by welding, preferably laser welding.

Purely from the point of view of manufacturing technique, the embodiment with a slotted sleeve possesses great advantages over the embodiment with grooves cut directly in the axle. When cutting grooves in the axle, a shank end mill must be used, and the axle must at the same time have a helical movement during the machining. On the other hand, the slits in the sleeve can be cut in a simple manner by a slotting mill when the tube is stationary. The fact that the slits will not coincide entirely with the directions of the principal stresses in their entire length, is of no consequence.

When measuring is to be performed in only one direction of torque, different angles can be used for the slits in the two zones to obtain improved linearity for the transducer. The theoretical basis for the reduction of the linearity error of magnetoelastic transducers by the combination of signal components in suitable proportions from elements with tensile and compressive stress, respectively, is known from Swedish Pat. No. 7614600, although the process described here is completely different.

BRIEF DESCRIPTION OF THE DRAWINGS

In the following the invention will be described with reference to the accompanying FIGS. 1 to 6.

FIGS. 1A and 1B show the measuring sleeve with two parallel zones having mutually parallel slits at an angle of approximately +45° and −45° in relation to a generatrix of the cylinder surface.

FIGS. 2A and 2B show an embodiment of the invention for the most common field of application with the measuring sleeve outside an axle and the coil system with the associated shell core surrounding the sleeve.

FIG. 3 shows a principle diagram for supply of the excitation coil and for measuring of the difference signal from the sensing coils.

DETAILED DESCRIPTION

Figure 4B:
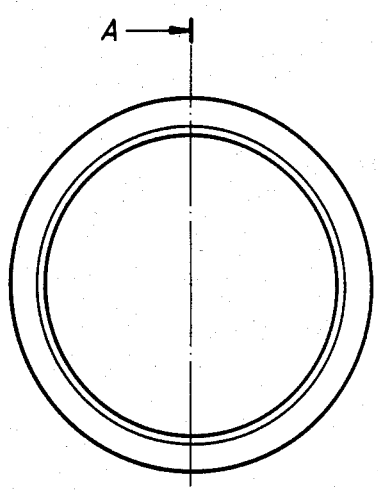
FIGS. 4A, 4B and 5 show the invention applied to a tubular axle with the measuring sleeve as a lining inside the axle and the stationary coils with the associated magnetic core inside the measuring sleeve.

FIGS. 1A and 1B show the measuring sleeve 1 of a soft-magnetic material and with the inner and outer cylinder surfaces well concentric. In two parallel, annular zones 2 and 3 at some distance away from each other, mutually parallel slits have been milled out, having an even pitch and making an angle of approximately +45° and −45° with a generatrix of the cylinder surfaces of the sleeve.

FIGS. 2A and 2B show the sleeve 1 soldered around a stationary axle 4, the torque of which is to be measured. Each zone 2, 3 is surrounded by two bobbins 16, 17, concentric with the axle 4, with the coils 8, 10 and 9, 11, of which 10 and 11 are used for excitation by alternating current with the coils series-connected and 8 and 9 are used for sensing the difference between the fluxes in the two zones with the coils oppositely connected. An iron core 5, made in the form of a solid of revolution with an E-shaped generating surface, surrounds the coils and has air gaps towards the axle at the three annular portions of the iron core. For reliable centering of the axle, it may be advantageous to fill up the air gap between the sleeve and the pole surfaces of the magnetic core with a non-magnetic sleeve of a suitable material having low friction, for example teflon or bronze.

If the zones are completely symmetrically formed, the output signal will be zero in case of unloaded axle, provided that the axle is well centered in the iron core 5, that the sleeve has homogeneous magnetic properties and that the sleeve is magnetically separated from the axle, for example by means of the solder layer formed during the soldering operation. Thereby it is only changes in the permeability in the direction of the bars in the zones that may affect the balance in the transducer. In case of excitation with such a high frequency that the penetration of the flux into the axle is negligible, the magnetic separation through the solder is of less importance.

Now, if the axle is subjected to a torsional movement, the bars in one zone will be subjected to tensile stress in the direction of flux and the bars in the other zone will be subjected to compressive stress in the direction of flux, with an ensuing increase and decrease, respectively, of the flux through both zones in case of materials having positive magnetostriction, for example iron with a moderate magnetization, thus obtaining a signal proportional to the torque.

FIG. 3 shows that the coils 10 and 11 are supplied in series from the AC source 13 and that the signal from the oppositely connected coils 8 and 9 is phase-sensitively rectified in the controlled rectifier 14 with a filter and is displayed on the instrument 15.

Figure 4A:
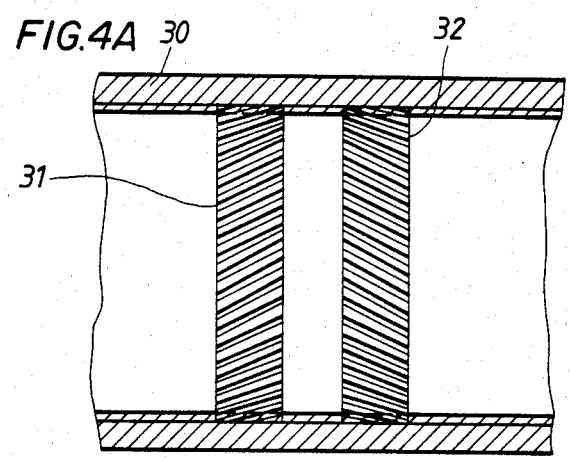
Figure 5:
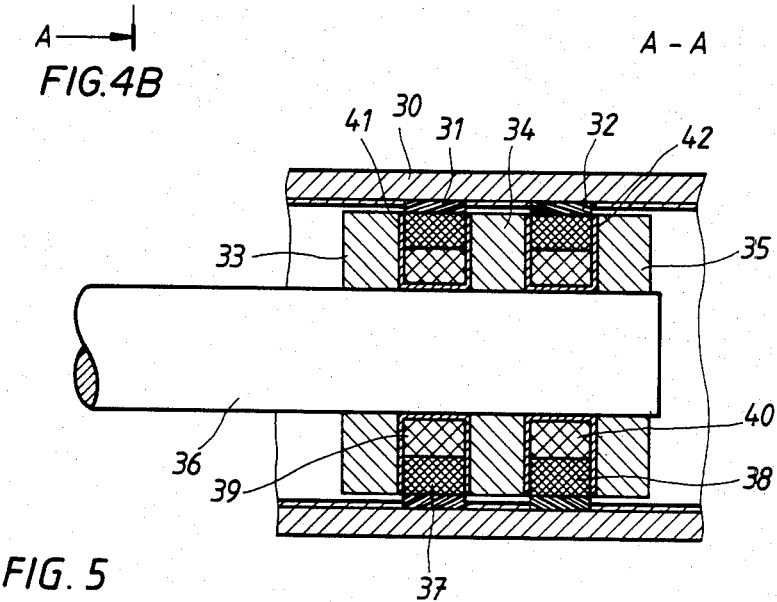

FIGS. 4A, 4B and 5 show the application of the invention to a tubular axle, where it is desirable to carry out the measuring inside the axle, whereby the axle and the transducer will change places. The torque-transmitting axle 30 has been lined on the inside with a sleeve having two slitted zones 31, 32. The soft-magnetic core here consists of a cylindrical pin 36 provided with three annular discs 33, 34, 35 between which the excitation coils 37, 38 and the sensing coils 39, 40 are placed on the bobbins 41, 42. The core with the coil system is retained concentrically with the tubular axle, for example by means of a projecting portion of the pin 36.

Figure 6:
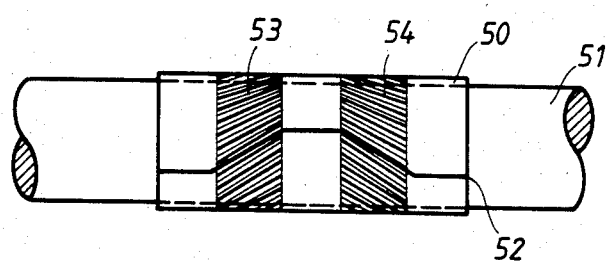
FIG. 6, finally, shows an embodiment of the invention which is especially suited for large axles, where it would be difficult to manufacture a thin measuring sleeve. In this case the sleeve can be replaced by a strip with punched slits which is attached around the axle.

FIG. 6 shows an embodiment of the invention which is specially suited for large axles 51, where a thin measuring sleeve would be difficult to manufacture. Here the sleeve has been replaced by a soft-magnetic strip 50 having punched or etched slits in two parallel zones 53, 54 in the same way as previously described for the sleeve. The strip joint 52 must, of course, follow the directions of the slits.

We claim:

1. A magnetoelastic torque transducer comprising:
an axle provided with a soft-magnetic sleeve permanently attached to said axle, said sleeve having two parallel, ring-formed measuring zones at a certain distance from each other, each measuring zone being formed by a number of parallel slits which in one of said measuring zones make an angle of about 45° with a generating line of the sleeve surface and in the other measuring zone make an angle of about −45° with said line,
two stationary coils, each concentric with one of said measuring zones, said coils arranged to be series-fed with alternating current for inducing an alternating magnetic flux in said sleeve,
two other stationary coils, each concentric with one of said two stationary coils, these other coils connected in series opposition to a phase sensitive rectifier connected to an indicating instrument, and
a core of soft-magnetic material concentric with said axle, said core together with said sleeve closing said magnetic flux and with a middle wall separating the two zones and their respective coils.

2. A magnetoelastic torque transducer according to claim 1, in which said sleeve is made of rolled tube material.

3. A magnetoelastic torque transducer according to claim 1, in which said sleeve is attached to an external cylindrical surface of said axle and said coils and said core surround said sleeved axle.

4. A magnetoelastic torque transducer according to claim 1, in which said sleeve is attached to an internal cylindrical surface in a hollow axle and said coils and said core are surrounded by said hollow axle.

5. A magnetoelastic torque transducer according to claim 1, in which said sleeve is formed by attaching a strip of magnetic material around said axle, said strip being formed with slits in the same pattern as said sleeve.

* * * * *